United States Patent [19]

Carlson

[11] 4,083,843
[45] Apr. 11, 1978

[54] 2,2'-AZOBIS(4,5-IMIDAZOLEDICARBONITRILE) AND DERIVATIVES

[75] Inventor: Bruce Arne Carlson, Claymont, Del.

[73] Assignee: E. I. Du Pont de Nemours and Company, Wilmington, Del.

[21] Appl. No.: 697,627

[22] Filed: Jun. 18, 1976

[51] Int. Cl.$^2$ .................. C09B 29/36; D06P 1/04; D06P 3/24; D06P 3/70

[52] U.S. Cl. .................. 260/157; 106/288 Q; 260/141; 260/146 R; 260/154; 260/156; 548/335

[58] Field of Search ........................................ 260/157

[56] References Cited

U.S. PATENT DOCUMENTS 3,770,764  11/1973  Webster ........................... 260/309

FOREIGN PATENT DOCUMENTS 1,400,789  7/1975  United Kingdom ................. 260/157

OTHER PUBLICATIONS

Kreutzberger, J. Org. Chem., vol. 27, pp. 886 to 889 (1962).
Kreutzberger et al., Arch. Pharm., vol. 305, No. 12, pp. 935 to 940 (1972).
Ruccia et al., Ann Di Chim., vol. 50, pp. 335 to 342 (1960).
Beyer et al., Chem. Ber., vol. 101, pp. 3151 to 3162 (1968).
Hoffman, "Imidazole and its Derivatives", Part I, pp. 136 to 141 (1953).
Khimia Get. Soed. (Riga) #9, pp. 1267 to 1272 (1970).
Kreutzberger et al. (II), Arch. Pharm., vol. 306, pp. 139 to 145 (1973).

*Primary Examiner*—Floyd D. Higel
*Attorney, Agent, or Firm*—Anthony P. Mentis

[57] ABSTRACT

2,2'-Azobis(4,5-imidazoledicarbonitrile), its alkyl derivatives, salts, metal complexes, hydrolysis products and hydrazine and hydroxylamine adducts are new compounds. The title compound having the formula

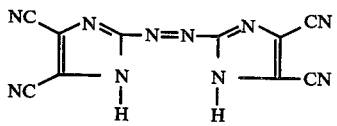

is useful as a yellow dye for nylon, polyacrylonitrile, wool and silk.

6 Claims, No Drawings

2,2'-AZOBIS(4,5-IMIDAZOLEDICARBONITRILE) AND DERIVATIVES

BACKGROUND OF THE INVENTION

1. Field of the Invention

This invention is concerned with 2,2'-azobis-(4,5-imidazoledicarbonitrile), its alkyl derivatives, salts, metal complexes, hydrolysis products and hydrazine and hydroxylamine adducts.

2. Description of the Prior Art

A. Kreutzberger, J. Org. Chem. 27, 886-91 (1962); A. Kreutzberger and R. Schücker, Arch. Pharm. 305, 935-40 (1972); and A. Kreutzberger and R. Schücker, Arch. Pharm. 306, 139-45 (1973) show a group of 2,2'-azobisimidazoles having aryl or aliphatic substituents in the 4,5,4',5' positions. The compounds are red to violet in color.

H. Beyer et al., Chem. Ber. 101, 3151-62 (1968), prepared 2,2'-azobisimidazoles with 2-4 aryl substituents in the 4,5,4',5' positions by oxidizing the corresponding 2-aminoimidazoles with activated manganese dioxide.

A. F. Pozharskii et al., Khim. Geterotsikl. Soedin., 1970, 1267-72, prepared 2,2'-azobis(benzimidazole) by treating 1-benzyl-2-aminobenzimidazole with sodium in liquid ammonia.

M. Ruccia et al., Ann. Chim. (Rome), 50, 335-42 (1960), prepared aryl substituted 4,4'-azobisimidazoles) by nitrous acid coupling of the corresponding 4-amino and 4-unsubstituted imidazoles.

K. Hoffman "Imidazole and Its Derivatives", Interscience Publishers, Inc., N.Y. (1953), pgs. 136-141. In the Pauly test for the immidazole ring, the reaction of an imidazole and a diazonium salt in aqueous sodium carbonate yields the corresponding unsymmetrical phenyl-2-azoimidazole.

O. W. Webster, U.S. Pat. No. 3,770,764 discloses 2-substituted-4,5-dicyanoimidazoles. None of the prior art discloses the compounds of this invention.

DESCRIPTION OF THE INVENTION

The invention is a compound
(A) of the formula

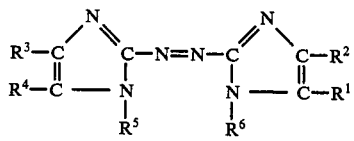   I in which
$R^1$, $R^2$, $R^3$ and $R^4$, alike or different, are
H, carboxylic acid (—COOH), carboxylic ester (—COOR$^7$) carboxylic salt (—COOM), carboxamide (—CONH$_2$), carboxamidoxime (—C-NOHNH$_2$), carbonyl halide (—COX) or carbonitrile (—CN),
with the proviso that up to two of $R^1$, $R^2$, $R^3$ and $R^4$ can be H, and with the proviso that the pairs $R^1$ and $R^2$ taken together and $R^3$ and $R^4$ taken together can both be

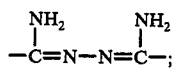

$R^5$ and $R^6$ are H, alkyl of 1-8 carbon atoms or aralkyl in which the alkyl group has 1-8 carbon atoms and the aryl substituent has 6-14 carbons as for example, phenyl, naphthyl, biphenyl and anthryl;
$R^7$ is alkyl of 1-8 carbon atoms;
M is one equivalent of an ammonium, a 1 to 8 carbon atom alkyl substituted ammonium, benzyl substituted ammonium, alkali metal or alkaline earth metal cation; and
X is F, Cl, Br or I;
(B) a salt of (A); or
(C) a transition metal complex of (A) where $R^1$, $R^2$, $R^3$ and $R^4$ are each CN and $R^5$ and $R^6$ are replaced by bonds to a transition metal atom.

In the above definitions alkyl can be straight chain, branched chain or cyclic.

When $R^5$ and $R^6$ in formula I are hydrogen, they are acidic hydrogens and ionizable in aqueous systems so that by known metathesis reactions with bases, oxides or hydroxides the corresponding salts are obtained.

The salts (B) may be represented by the formula

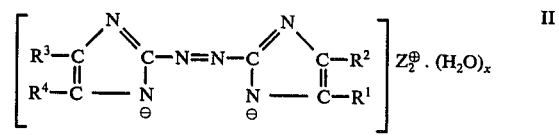   II where $R^1$, $R^2$, $R^3$ and $R^4$ are defined as above, $x$ is a number from 0 to 6 and Z is one equivalent of an ammonium, a 1-8 carbon alkyl substituted ammonium or benzyl substituted ammonium cation or one equivalent of an alkali or alkaline earth metal cation with the proviso that one of the Z's can be hydrogen. In the formula two Z's taken together may represent a divalent cation. The free salts are yellow to golden in color and may be hydrated.

The transition metal complexes (C), of the compound of formula I in which $R^1$, $R^2$, $R^3$ and $R^4$ are CN and $R^5$ and $R^6$ are replaced by bonds to a transition metal atom, can be represented by the formula $(C_{10}N_{10})_a Q_b \cdot (H_2O)_c$   III in which Q is a transition metal and c is 1-6.
When Q is in oxidation state I, a is 1 and b is 1 or 2.
When Q is in oxidation state II, a is 1 and b is 1.
When Q is in oxidation state III, a is 3 and b is 2.
Thus Q can be any metal with an atomic number of 21-32, 39-51, 57-84 and 89-103 and above. The preferred metal species include Ag(I), Au(I), Cu(I), Cu(II), Pd(II), Pt(II), Rh(I), Rh(III), Ni(II), Mn(II), Cr(II), Co(II), Fe(II), Zn(II), Hg(II) and Pb(II). The complexes can be monomeric or polymeric and their colors are distinctly more red than those of the salts of formula II.

2,2'-Axobis(4,5-imidazoledicarbonitrile), the compound of formula I in which $R^1 = R^2 = R^3 = R^4 =$ CN and $R^5 = R^6 =$ H, can be designated by the acronym TCAD (from tetracyanoazodiimidazole). TCAD can form strong, isolable 1:1 charge transfer complexes with organic electron donors such as tetrathiafulvanene and phenothiazine, and weakly associated complexes in solution with donors such as cis-1,2-dimethoxyethylene and 2,3-dimethyl-1,3-butadiene.

TCAD adds four moles of hydroxylamine to yield 2,2'-azobis(4,5-imidazolebis[carboxamidoxime]), the compound of formula I where $R^1 = R^2 = R^3 = R^4 =$ carboxamidoxime and $R^5 = R^6 =$ H.

TCAD also adds two moles of hydrazine to yield 2,2'-azobis(4,7-diamino-1H-imidazo[4,5,d]pyridazine), a compound of the formula

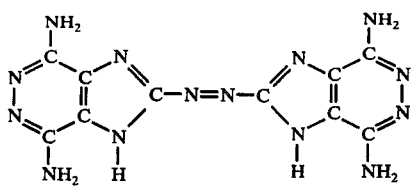

IV 2,2'-Azobis(4,5-imidazoledicarbonitrile) may be prepared in one step by the reductive coupling of 2-diazo-4,5-dicyano-2H-imidazole (U.S. Pat. No. 3,770,764) in the presence of a reducing agent such as an alkali metal sulfite, an alkali metal hydrosulfite or an alkali metal borohydride. The diazo compound is explosive and must be handled accordingly. The preferred reaction may be indicated by the equation.

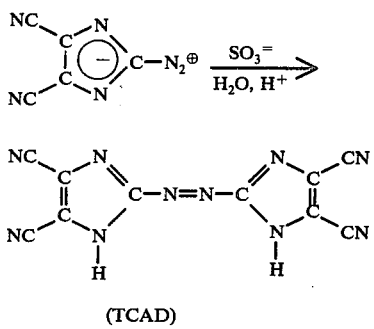

(TCAD)

TCAD is a bright yellow compound, $\lambda_{max}$ 390 ($\epsilon$ 23,580). By UV analysis it has a pKa of 1.0 – 1.5. TCAD also can be in hydrated form.

This preparation can be carried out in aqueous acidic media having a pH in the range of 1 to 7, best yields being obtained at pH 1-2. Molar equivalent ratios of reducing agent to 2-diazo-4,5-dicyano-2H-imidazole may vary from 1:2 to 3:1. Equimolar quantities are preferred. The reaction may be carried out in the temperature range from −10° to 50° C with the range of 0° to 25° C being preferred.

An alternative method involves treating 2-diazo-4,5-dicyanoimidazole with pyridine to obtain the corresponding bispyridinium salt of TCAD, from which TCAD is liberated by treatment with acid.

In another method 2-amino-4,5-dicyanoimidazole under neutral or basic conditions is treated with an oxidizing agent such as a metal oxide, bromine, sodium hypochlorite, potassium permanganate, potassium persulfate, hydrogen peroxide and the like to obtain TCAD or the corresponding metal salt or chelate of TCAD, from which TCAD is liberated by treatment with acid or with a stronger chelating agent such as cyanide ion or hydrogen sulfide.

Compounds of formula I in which $R^5$ and $R^6$ are alkyl or aralkyl are prepared by treating the corresponding compound of formula I in which $R^5$ and $R^6$ are hydrogen with an alkylating agent such as dialkyl or diaralkyl sulfate in a polar solvent such as dimethylformamide in the presence of a base such as magnesium oxide. Alternatively a salt of formula II may be treated with an alkylating agent such as an alkyl halide in a polar solvent such as dimethylformamide.

Compounds of formula I in which $R^1$, $R^2$, $R^3$ and $R^4$ are carboxamide or carboxylic acid are prepared by treating the corresponding compounds in which $R^1$, $R^2$, $R^3$ and $R^4$ are carbonitrile with a strong acid such as HCl or $H_2SO_4$ or strong bases such as NaOH at temperatures from 0° to 100° C followed by neutralization.

SPECIFIC EMBODIMENTS OF THE INVENTION

The following are representative examples of the invention in which all parts are by weight and all temperature degrees are Centigrade unless otherwise noted.

EXAMPLE 1

2,2'-Azobis(4,5-imidazoledicarbonitrile)

5.34 g (40 mmol) of 2-amino-4,5-dicyanoimidazole was dissolved in 130 ml water plus 30 ml conc. hyrdrochloric acid and diazotized by the slow addition (over 5 min) of a solution of 4.0 g of sodium nitrite in 15 ml of water. The mixture was then stirred and cooled to 0°–10° for 45 minutes. The resulting cold suspension of 2-diazo-4,5-dicyanoimidazole was poured into a stirred solution of 12.4 g of sodium sulfite and 2.2 g of sodium hydroxide in 50 ml of water at 0°. An immediate yellow precipitate formed. The mixture was stirred at 0° for 30 minutes and then the yellow solid was filtered and air dried. This gave 0.85 g of 2,2'-azobis(4,5-imidazoledicarbonitrile). Recrystallization from water gave golden plates. UV(CH$_3$CN): 390 nm, k 90.0; sh 375 nm, k 83.4; 237 nm, k 41.3).

EXAMPLE 2

2,2'-Azobis(4,5-imidazoledicarbonitrile)

In a glass reactor 7.98 g (60 mmol) 2-amino-4,5-dicyanoimidazole was dissolved in 200 ml water plus 45 ml conc. hydrochloric acid. At 0° the stirred solution was diazotized over ∼ 10 minutes by the slow addition of 6.0 g sodium nitrite dissolved in 15 ml water. The mixture was stirred for 1 hour at 0° to insure complete reaction. Then 7.52 g (60 mmol) anhydrous sodium sulfite dissolved in ∼40 ml of water was added at once to the vigorously stirred suspension of 2-diazo-4,5-dicyanoimidazole. The bright yellow mixture was stirred for 30 minutes at 0° and filtered. The yellow cake was washed with a little cold water and air dried. This procedure was repeated two more times giving a total of 15.4 g of crude material. The crude product was recrystallized from boiling water (∼600 ml). The hot solution was filtered. The yellow filtrate deposited golden plates on cooling. The product was collected at 0°, washed with a little ice water and dried in a vacuum oven at 70°. This gave 9.6g (41%) of 2,2'-azobis(4,5-imidazoledicarbonitrile); mp >300°.

Ir(nujol): 2.78 μ, 2.86 μ, and 2.94 μ (H-bonded H$_2$O and NH); broad, weak band 3.8 – 5.4 μ (hydrated species); 4.45 μ (conj. C≡N); 6.12 μ, 6.18 μ, and 6.38 μ (C=C and/or C=N).

UV(CH$_3$CN): 390 nm, k 90 ($\epsilon$23,580); 375nm (sh), k 83.4 ($\epsilon$21,850); 237 nm (sh), k 41.3 ($\epsilon$10,820); no fluorescence observed.

Mass Spec: $M^+262 \xrightarrow{-N_2}$ m/e 234 $\xrightarrow{-NCCN}$

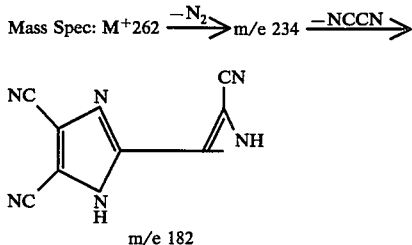

m/e 182

Carbon-13 NMR (Shifts in ppm from TMS)

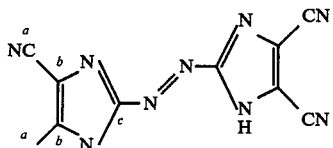

a, 110.68; b, 119.06; c, 152.52

Anal. Calcd. for $C_{10}H_2N_{10}\cdot H_2O$: C, 42.86; H, 1.44; N, 49.99. Found: C, 43.31; H, 1.53; N, 49.90.
$pK_a$ by $UV(H_2O) = 1.0-1.5$

EXAMPLE 3

Bispyridinium Salt of 2,2′-Azobis(4,5-imidazoledicarbonitrile)

40 mmol of 2-diazo-4,5-dicyanoimidazole was prepared as in Example 1. It was recovered by filtration, washed with water (Caution: explosive if allowed to dry) and then rinsed into a glass reactor with 75 ml acetonitrile. At 0° C 3.2 g (40 mmol) of pyridine was added. After 10 minutes the yellow solution was warmed to room temperature. After 45 minutes 0.1 g $CuCl_2$ was added and nitrogen began to evolve. The mixture was stirred for 2 hours and then 0.05 g of the yellow, crystalline bispyridinium salt of 2,2′-azobis(4,5-imidazoledicarbonitrile) was recovered by filtration. An additional 0.35 g of this product was obtained from the remaining solution after 24 hours and a final 0.63 g after three days. This represented a total yield of about 12%, mp 240°–243° C (with darkening).

Ir(KBr): 3.25 μ (≡CH); 3.5–4 μ region suggest NH; 4.49 μ (conj. C≡N); 6.12 μ, 6.22 μ, 6.52 μ, and 6.71 μ (conj. C=C and/or C=N) 13.17 and 14.61 μ (N-substituted pyridine ring).

UV(CH$_3$CN): 397 nm, k 49 (ε20,580).

Mass Spec: M$^+$ (-2pyridines) 262 other ions m/e 234 (s), 182 (m), 133, 117 (s), 116 (s) 106 (s), 90 (s), 78 (s), 50 (vs.)

Anal. Calcd. for $C_{20}H_{12}N_{12}$: C, 57.14; H, 2.88; N, 39.98. Found: C, 56.70; H, 2.87; N, 39.88.

EXAMPLE 4

Nickel complex of 2,2′-Azobis(4,5-imidazoledicarbonitrile)

7.98 g of 2-amino-4,5-dicyanoimidazole was dissolved in 90 ml of acetonitrile and a slurry of 54 g of nickel peroxide in 150 ml of acetonitrile was added and rinsed in with 100 ml of additional acetonitrile. The mixture turned orange immediately. The reaction was stirred overnight. The mixture was poured through a Soxhlet thimble, and the solid extracted overnight with acetonitrile. The extract was filtered and evaporated giving 3.46 g of a nickel complex of 2,2′-azobis(4,5-imidazoledicaronitrile) in the form of a deep orange/red solid; mp >300°.

Ir (nujol): Broad and diffuse spectrum, showed diffuse H-bonded OH or NH around 3 μ; 4.48 μ nitrile and amide-like bands around 6 μ.

UV(CH$_3$CN): 300 nm, k 13.0; 390 nm (sh), k 5.9; 440 nm (sh), k 4.4.

EXAMPLE 5

Manganese Complex of 2,2′-Azobis(4,5-imidazoledicarbonitrile)

13.3 g 2-amino-4,5-dicyanoimidazole and 52.2 g of activated manganese dioxide in 250 ml of 1:1 benzene/acetonitrile was refluxed for 6 hours and stirred overnight at room temperature. The solids were filtered and washed two times with 100 ml of acetonitrile. Evaporation of the solvent left 4.2 g of a manganese complex of 2,2′-azobis(4,5-imidazoledicarbonitrile) in the form of an orange/brown solid. Soxhlet extraction of the manganese residues gave another 2.0 g of product; mp >300°.

UV(CH$_3$CN): sh 450 nm; 380 nm, k 19; 387 nm, k 48.

EXAMPLE 6

2,2′-Azobis(1-methyl-4,5-imidazoledicarbonitrile)

8.1 g of 2,2′-azobis(4,5-imidazoledicarbonitrile), 4.0 g of magnesium oxide and 21 ml of dimethyl sulfate were combined in 250 ml of anhydrous dimethylformamide and heated to 90° with stirring. After 30 minutes, 21 ml additional dimethyl sulfate was added and the dark reaction mixture heated for 30 minutes more. The mixture was then poured into 500 ml of water and heated to 65° for one hour. The mixture was cooled and filtered giving a yellow-brown solid. The product recrystallized from boiling dimethylsulfoxide after treatment with activated carbon to give 5.9 g (69%) of orange, irridescent prisms of 2,2′-azobis(1-methyl-4,5-imidazoledicarbonitrile), mp 313.5°–316.5° (D).

Ir(KBr): no NH; 4.44 μ (C≡N); 6.75 μ (conj. C=C and/or C=N).

UV(DMSO): 395 nm, k 64.2 (ε18,618); 378 nm, k 69.1 (ε20,040); 258 nm, k 38.2 (ε11,078); also shoulder at 425 nm, k 23.6 (ε6854).

NMR(DMSO,d$_6$): 3.25 δ singlet

Mass Spec: M$^+$290.0756; calc. for $C_{12}H_6N_{10}$, 290.0777 m/e 261, 247, 236, 158, 147, and 132.

EXAMPLE 7

2,2′-Azobis(1-ethyl-4,5-imidazoledicarbonitrile)

2.62 g of 2,2′-azobis(4,5-imidazoledicarbonitrile), 0.8 g of magnesium oxide and 5.0 ml of diethyl sulfate were heated with stirring to 80° in 75 ml of anhydrous dimethylformamide for 30 minutes. 5.0 ml additional diethyl sulfate was added and the mixture heated for 30 minutes more, poured into 150 ml of water and heated to 65° for 1 hour. The mixture was then cooled to ~10° and the orange solid filtered giving 1.45 g (49%) of the product. The product was soluble in dimethylsulfoxide, acetone and hot ethanol. It was recrystallized from ethanol and a little water giving bright orange needles of 2,2′-azobis(1-ethyl-4,5-imidazoledicarbonitrile); mp 268–269.5° (D).

Ir(nujol): no NH; 4.43μ (C≡N); 6.60μ, 6.77μ, and 7.0μ (conj. C=C and/or C=N); 7.42μ, 7.65μ, 8.24μ, 10.16μ, 11.65μ, 12.56μ, 13.45μ, and 14.29μ.

NMR (CD₃CN): c.a. 4.40 δ, quartet (J = 7.3 Hz, 2H); c.a. 1.20 δ, triplet (J = 7.3 Hz, 3H).

$^{13}$C NMR (CD₃CN, ppm from TMS): a, 116.59; b, 112.56; c, 108.73; d, 123.74; e, 153.70; f, 44.32; g, 16.25.

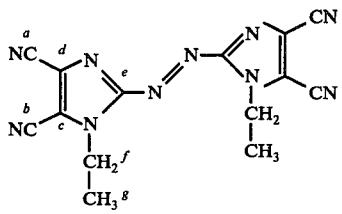

Anal. Calcd. for $C_{14}H_{10}N_{10}$: C, 52.83; H, 3.17; N, 44.00. Found: C, 52.70; H, 3.39; N, 44.39.

EXAMPLE 8

Bis(di-2-pyridyl ketone) Salt of 2,2'-Azobis(4,5-imidazoledicarbonitrile)

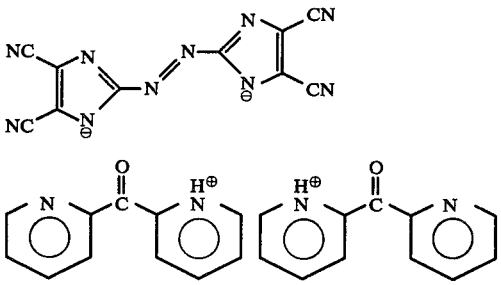

2.62 g of 2,2'-azobis(4,5-imidazoledicarbonitrile) and 1.84 g of di-2-pyridyl ketone were taken up in 175 ml of acetonitrile. The solvent was boiled down to ~100 ml. From the cooled solution the salt crystallized in long fluffy golden needles which were filtered and dried. This gave 2.0 g (64.5% based on di-2-pyridyl ketone) of the bis(di-2-pyridyl ketone) salt of 2,2'-azobis(4,5-imidazoledicarbonitrile), mp 197°–200° (red in melt, then decomp.).

Ir(KBr): 3.23 μ (CH); broad 3.5–4.0 μ (H bonded NH); 5.93 μ, 7.53 μ, 10.04 μ, 10.49 μ, 12.12 μ, 12.81 μ, and 13.39 μ (related to di-2-pyridyl ketone); 4.45 μ (C≡N); 6.15 and 6.27 μ (aromatic C=C and/or C=N).

UV(CH₃CN) : does not follow Beer's law: 395 nm, k 37.1 (ε23,310); 390 nm, k 36.0 (ε22,680); 272 nm, k ~52.

NMR (CD₃CN): c.a. 7.85 δ, AB-4 lines (J = 4 Hz, 1H); c.a. 8.23 δ, doublet (J = 4 Hz, 2H); 8.65 δ, broad-D₂O exchangeable (1H); c.a. 8.82 δ, doublet (J = 4Hz, 1H).

Anal. Calcd. for $C_{32}H_{18}N_{14}O_2 \cdot \frac{1}{2} H_2O$: C, 60.09; H, 2.99; N, 30.66. Found: C, 59.88, 59.94 H, 3.05, 3.05 N, 30.68, 30.93.

EXAMPLE 9

Bis(triethylamine) Salt of 2,2'-Azobis(4,5-imidazoledicarbonitrile)

1.31 g of 2,2'-Azobis(4,5-imidazoledicarbonitrile) was heated in ~100 ml of water with excess triethylamine for several minutes. After cooling and standing for 48 hours, the bright yellow crystals of the salt were collected and washed with a little cold water. This gave 1.40 g of the bis(triethylamine) salt of 2,2'-azobis(4,5-imidazoledicarbonitrile), mp 203°–205°.

Ir(KBr): 3.34 μ, sat. CH; 3.5–4 μ, H-bonded NH, 4.51 μ, conj. C≡N; 6.72 μ conj. cyclic C=C and/or C=N.

Anal. Calcd. for $C_{22}H_{32}N_{12}$: C, 56.88; H, 6.91; N, 36.18. Found: C, 57.18; H, 6.97; N, 36.29.

EXAMPLE 10

1,3-Trimethylenediamine Salt of 2,2'-Azobis(4,5-imidazoledicarbonitrile)

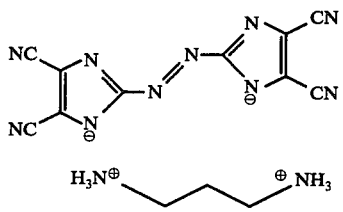

2.62 g of 2,2'-azobis(4,5-imidazoledicarbonitrile) was dissolved in 100 ml of tetrahydrofuran and 0.74 g of 1,3-trimethylendiamine was added. This caused immediate precipitation of the bright yellow salt. The product was filtered after stirring overnight and dried, giving 2.55 g of the 1,3-trimethylenediamine salt of 2,2'-azobis(4,5-imidazoledicarbonitrile), dec. 260°–265°.

UV(H₂O): Does not obey Beer's Law; 280 nm (ε~12,036); 371 and 388 nm (ε~13,100), sh. 428 nm (ε~8496).

Anal. Calcd. for $C_{13}H_{12}N_{12} \cdot H_2O$: C, 44.07; H, 3.98; N, 47.43. Found: C, 44.26; H, 4.38; N, 46.05.

EXAMPLE 11

Bisammmonium Salt of 2,2'-Azobis(4,5-imidazoledicarbonitrile)

2.62 g of 2,2'-azobis(4,5-imidazoledicarbonitrile) was added to 75 ml of ammonium hydroxide solution. The mixture was warmed to give a clear solution which on cooling crystallized bright yellow needles of the product. The product was filtered and washed with a little cold water. Drying under vacuum at 70° gave 2.15 g of the bisammonium salt of 2,2'-azobis(4,5-imidazoledicarbonitrile), mp >310°.

Ir(KBr): 3.1 μ, NH; 4.47 μ, conj. C≡N

UV(H₂O): Does not obey Beer's law; 288 nm (ε~12,650), 370 and 388 nm (ε~13,645), Sh, 430 nm (ε~8915).

Anal. Calcd. for $C_{10}H_6N_{12} \cdot 2H_2O$: C, 36.15; H, 3.64; N, 50.58. Found: C, 36.25; H, 3.83; N, 50.46.

EXAMPLE 12

Bis(tetra-n-butylammonium) Salt of 2,2'-azobis(4,5-imidazoledicarbonitrile)

2.65 g of 2,2'-azobis(4,5-imidazoledicarbonitrile) was dissolved in 100 ml of tetrahydrofuran and 10 ml of 1.0 M solution of tetra-n-butylammonium hydroxide in methanol was added. This gave a deep orange solution. This was stirred overnight and heated to reflux for 6 hours. Evaporation of the solvents and trituration with ethanol gave 4.70 g of the yellow bis(tetra-n-butylammonium) salt of 2,2'-azobis(4,5-imidazoledicarbonitrile), mp 162°–163°.

Ir(KBr): 3.35 and 3.45 μ, sat. CH; 4.50 μ, cong. C≡N; 6.70 μ, conj. cyclic C=C and/or C=N.

UV(CH₃CN): 218 nm (ε21,400); 287 nm (ε17,300); 372 nm (ε23, 400), sh. 420 nm.

Anal. Calcd. for $C_{42}H_{72}N_{12}$: C, 67.71; H, 9.74; N, 22.56. Found: C, 67.67; H, 9.74; N, 22.75.

EXAMPLE 13

Calcium Salt of 2,2'-Azobis(4,5-imidazoledicarbonitrile)

2.62 g of 2,2'-azobis(4,5-imidazoledicarbonitrile) was taken up in 300 ml of water and 1.79 g of calcium acetate monohydrate was added. The mixture was heated to ~70° to give a clear yellow solution. On standing at room temperature overnight the solution deposited long golden needles. The mixture was cooled to 0° and filtered to give 2.75 g of golden calcium salt of 2,2'-azobis(4,5-imidazoledicarbonitrile). A second crop of 0.25 g was obtained. The UV spectrum did not follow Beer's law.

| Anal. Calcd. for | $C_{10}N_{10}Ca \cdot 6H_2O$: | | | | | | |
|---|---|---|---|---|---|---|---|
| | C, | 29.41; | H, | 2.96; | N, | 34.30; | O, 23.51. |
| Found: | | | | | | | |
| | C, | 29.11; | H, | 2.61; | N, | 33.69; | O, 23.29 |
| | | 29.57 | | 2.21 | | 33.87 | 23.35 |

EXAMPLE 14

Monosodium Salt of 2,2'-Azobis(4,5-imidazoledicarbonitrile)

A mixture of 1.32 g of 2,2'-azobis(4,5-imidazoledicarbonitrile) and 1.36 g of sodium acetate trihydrate in 100 ml of water was heated at ~70° and allowed to stand overnight. 1.0 g of the bright orange/yellow monosodium salt was recovered by filtration. It was identified by Ir and UV spectra.

Anal. Calcd. for $C_{10}HN_{10}Na.3H_2O$: C, 35.30; H, 2.07; N, 41.17; O, 14.11. Found: C, 35.35; H, 2.38; N, 41.00; O, 14.02, 14.27, 14.62.

EXAMPLE 15

Manganese II Complex of 2,2'-Azobis(4,5-imidazoledicarbonitrile)

1.32 g of 2,2'-azobis(4,5-imidazoledicarbonitrile) was added to a solution of 2.45 g of manganese II acetate tetrahydrate in 200 ml of water. The mixture was heated to give a clear red solution, filtered hot and allowed to cool slowly to room temperature. The resulting red-/orange crystals of the manganese complex of 2,2'-azobis(4,5-imidazoledicarbonitrile) were filtered and oven dried at 70°. This gave 1.0 g of bright red product, mp >300°.

Anal. Calcd. for $C_{10}N_{10}Mn.2.5H_2O$: C, 33.35; H, 1.40; N, 38.89. Found: C, 33.45; H, 1.45; N, 38.94.

The UV spectrum ($H_2O$) showed an enhanced shoulder at 435 nm. The spectrum did not follow Beer's Law.

EXAMPLE 16

Silver Complex of 2,2'-Azobis(4,5-imidazoledicarbonitrile)

1.40 g of 2,2'-azobis(4,5-imidazoledicarbonitrile) was dissolved in 150 ml of hot water. Then a solution of 1.67 g of silver acetate in 200 ml of warm water was added. An immediate precipitation of a brick red solid occurred. After cooling this was filtered and washed with water. Drying in vacuo overnight gave 2.30 g of hydrated $C_{10}N_{10}Ag_2$ in the form of a deep red solid, mp >310°.

Ir(KBr): 4.48 μ, conj. C≡N; broad 3 μ and 6.05 μ suggests hydrated species; 6.32 μ and 6.62 μ conj. C═C and/or C═N.

EXAMPLE 17

Nickel II Complex of 2,2'-Azobis(4,5-imidazoledicarbonitrile)

2.65 g of 2,2'-azobis(4,5-imidazoledicarbonitrile) was dissolved in 300 ml of hot water and a solution of 3.54 g of nickel II acetate tetrahydrate in 100 ml of water was added. This gave an immediate deep red solution. The solution was cooled rapidly to 10° and the resulting red precipitate filtered. The cherry red crystals turned to a very deep red on drying overnight. This plus a second crop of solid isolated from the filtrate gave 1.60 g of the deep red hydrated 1:1 complex of Ni II with 2,2'-azobis-imidazoledicarbonitrile), mp >300. The complex was soluble in acetonitrile but only sparingly soluble in water.

UV($H_2O$): Did not follow Beer's Law: 442 nm, k 40.0; 400 nm, k 29.8. Analysis indicated a composition: $C_{10}N_{10}Ni.4.5H_2O$.

EXAMPLE 18

Cobalt II Complex of 2,2'-Azobis(4,5-imidazoledicarbonitrile)

2.65 g of 2,2'-azobis(4,5-imidazoledicarbonitrile) was dissolved in 300 ml of hot water and a solution of 2.49 g of cobalt II acetate tetrahydrate in 100 ml of water was added. The resulting deep red solution was cooled rapidly to 10° and the red complex filtered. A second crop was obtained from the filtrate and air dried to give a total of 1.35 g of a hydrated complex of Co II with 2,2'-azobis(4,5-imidazoledicarbonitrile), mp >300°. The complex was partially soluble in acetonitrile and tetrahydrofuran.

UV (DMSO) does not obey Beer's Law: 423 nm, k 29.8; 393 nm, k 39.1; 377 nm, k 39.1; 276 nm, k 34.6.

Anal. Calcd. for $C_{10}N_{10}Co.3H_2O$: C, 32.19; H, 1.62; N, 37.54; O, 12.86. Found: C, 32.08; H, 1.74; N, 37.21; O, 12.19.

EXAMPLE 19

Lead II Complex of 2,2'-Azobis(4,5-imidazoledicarbonitrile)

1.32 g of 2,2'-azobis(4,5-imidazoledicarbonitrile) and 1.90 g of lead II acetate trihydrate were heated in 200 ml of water for 2 hours. The clear red solution was then cooled to 10° and the bright pink/orange product filtered and air dried. This gave 1.90 g of bright orange solid complex which turned black on evolution of its water of hydration at ~150° (mp >300°), but immediately turned bright orange on reexposure to water vapor.

Anal. Calcd. for $C_{10}N_{10}Pb.2H_2O$: C, 23.86; H, 0.80; N, 27.82; O, 6.36. Found: C, 24.12; H, 1.03; N, 27.47; O, 6.75.

EXAMPLE 20

Zinc II Complex of 2,2'-Azobis(4,5-imidazoledicarbonitrile)

1.35 g of 2,2'-azobis(4,5-imidazoledicarbonitrile) and 1.10 g of zinc II acetate dihydrate were heated in 200 ml water until a clear orange solution formed. The solution was cooled to 0° and the bright orange precipitate which formed was filtered off, washed with cold water and air dried to yield 1.60 g of a hydrated complex of Zn II with 2,2'-azobis(4,5-imidazoledicarbonitrile) in the form of a bright orange solid. This solid dehydrated at ~150° to form a red/black anhydrous complex, mp >300°. The bright orange hydrated complex was regenerated on exposure to moisture. It was identified by UV absorption.

EXAMPLES 21–31

In separate test tube experiments approximately 0.1 g of 2,2'-azobis(4,5-imidazoledicarbonitrile) was dissolved in the solvent indicated and an approximately equivalent amount of the indicated metal salt was added. After warming and then cooling, the corresponding complexes of the indicated color were formed as shown in Table I.

Table I

| Example | Metal Salt | Solvent | Color of Complex |
|---|---|---|---|
| 21 | CuCl | H₂O | Black powder |
| 22 | CuCl₂ | H₂O | Deep red solid |
| 23 | Ni(OAc)₂ | H₂O | Deep red |
| 24 | Pd(OAc)₂ | H₂O | Deep red |
| 25 | H₂PtCl₆ | Isopropanol | Apple green |
| 26 | CuCl₂ . 2H₂O | Isopropanol | Dark orange |
| 27 | Ni(NO₃)₂ . 6H₂O | Isopropanol | Pink/orange |
| 28 | Co(NO₃)₂ . 6H₂O | Isopropanol | Orange |
| 29 | FeSO₄ . 7H₂O | Isopropanol | Green |
| 30 | MnCl₂ . 4H₂O | Isopropanol | Yellow |
| 31 | FeCl₂ | H₂O | Dark brown |

EXAMPLE 32

2-(4,5-Dicyano-1H-imidazol-2-ylazo)-1H-imidazole-4,5-dicarboxylic acid

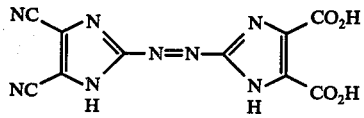

40 mmol of 2-diazo-4,5-dicyanoimidazole was prepared as in Example 1. It was filtered, washed with water and the moist cake added with a plastic spatula behind a safety shield in small portions to a solution of 6.24 g (40 mmol) 4,5-imidazoledicarboxylic acid in 95 ml of 10% sodium hydroxide at 0°. After addition the deep red solution was stirred at 0° for 30 minutes and then neutralized with acetic acid. The resulting red precipitate was filtered, washed with water and air dried. The product was triturated with ~200 ml of methanol and the rust brown product dried giving 7.55 g of 2-(4,5-dicyano-1H-imidazol-2-ylazo)-1H-imidazole-4,5-dicarboxylic acid, mp >300°.

Ir(KBr): 2.75 μ – 4.0 μ, H-bonded NH and acid OH; 4.49 μ, conj. C≡N; 5.85 μ, acid C=O; 6.16 μ 6.37 μ and 6.52 μ, C=C, C=N and acid C=O.

UV(H₂O): 390 nm, k 39.3 (ε~11,800); sh. 440 nm, k 25.8 (ε~7,750).

EXAMPLE 33

2-(4,5-Dicyano-1H-imidazol-2-ylazo)-1H-imidazole

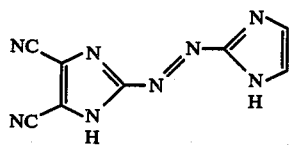

2-Diazo-4,5-dicyanoimidazole was prepared on a 40 mmol scale as in Example 1, filtered, washed with water, and rinsed into a 250 ml flask with 100 ml of water. Then 2.72 g (40 mmol) of imidazole in 25 ml of water was added at once. This gave an immediate orange color and burnt-orange precipitate. After stirring for 20 minutes, the product was filtered, washed three times with 20 ml of cold acetonitrile to dissolve away any unreacted diazo intermediate and air dried. This gave 5.6 g of 2-(4,5-dicyano-1H-imidazol-2-ylazo)-1H-imidazole in the form of a burnt-orange solid (65%), mp >300°.

Ir(nujol): 3.13 μ (NH); 3.5–4.3 μ (H-bonded NH); 4.43 μ, (conj. C≡N); 4.8–5.4 μ (broad (H-bonding); 6.01 μ, 6.23 μ, and 7.02 μ (C=C and/or C=N)

UV(CH₃CN): consistent with 2,2'-azoimidazole 392 nm, k 69.1 (ε15,870); 430 (sh), k 45.5 (ε10,465).

EXAMPLE 34

Hydrolysis of 2,2'-Azobis(4,5-imidazoledicarbonitrile)

1.32 g of 2,2'-azobis(4,5-imidazoledicarbonitrile) was dissolved in 50 ml of conc. sulfuric acid and stirred at room temperature for 16 hours. The orange solution was then poured with stirring into 200 ml of water. An immediate yellow precipitate formed which darkened to orange after 10–15 minutes. The orange solid was filtered after 2 hours. Air drying gave 1.85 g of orange product. The product showed no cyano groups in its ir spectrum, but gave evidence of both acid and amide bands. Thus, hydrolysis under these conditions resulted in a mixed acid/amide of the formula

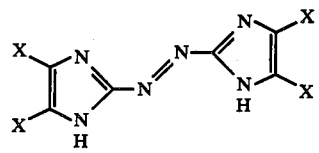

in which X = COOH or

with a ratio of carboxyl to carboxamide of about 1 to 3 by analysis.

EXAMPLE 35

Hydrolysis of 2,2'-Azobis(1-methyl-4,5-imidazoledicarbonitrile)

2.0 g of 2,2'-azobis(1-methyl-4,5-imidazoledicarbonitrile) from Example 6 was dissolved in 100 ml of conc. sulfuric acid and stirred for two hours. The deep orange solution was then poured into 300 ml of ice and water. This gave a deep yellow product of color similar to lead chromate. The product was filtered, washed with water and dried in a vacuum oven at 70°. This gave 3.35 g of orange product which appeared to be hygroscopic, taking on a brighter yellow color in the presence of water. The product is a sulfate salt of a mixed acid/amide hydrolysis derivative of the starting material by ir and elemental analysis.

Analysis: C, 26.66; H, 3.62; N, 24.33; O, 32.84. Treatment of this salt with sodium hydroxide solution caused a jet-black color characteristic of radical anion formation which faded rapidly and gave a yellow solid.

EXAMPLE 36

Hydrazine adduct of 2,2'-Azobis(4,5-imidazoledicarbonitrile)

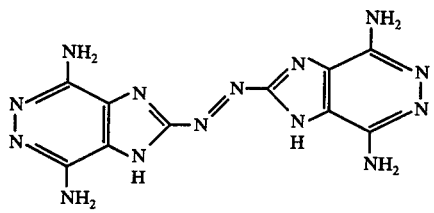

2.62 g of 2,2'-azobis(4,5-imidazoledicarbonitrile) was slurried in 30 ml of p-dioxane to which had been added 2 ml of 50% aqueous acetic acid. Then 3.0 g of hydrazine hydrate was added. After the initial exotherm, the reaction was heated to reflux for three hours. The brown slurry was then poured into 100 ml of water and the orange solid filtered and washed well with water. Air drying gave 2.60 g of the orange 2,2'-azobis(4,7-diamino-1H-imidazo[4,5,d]pyridazine), mp >310°. 0.6 g of a second crop was obtained on addition of more water to the filtrate. The material was too involatile for mass spectrometric characterization and too insoluble in water and organic solvents to permit ready purification. UV of a very dilute sample of the derivative in dimethylsulfoxide showed a band at 385 nm characteristic of the bis imidazoazo species. Ir spectrum of the derivative showed no cyano absorption but did show absorption in the 3.0 μ region characteristic of the primary amino groups. The powdered orange compound can be used as a pigment.

EXAMPLE 37

2,2'-Azobis(4,5-imidazolebis[carboxamidoxime])

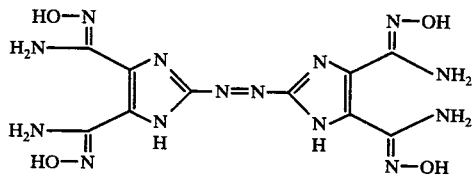

2.72 g of 2,2'-azobis(4,5-imidazoledicarbonitrile) was taken up in 200 ml of warm methanol. Then a solution of 5.8 g of hydroxylamine hydrochloride and 7.0 g of sodium bicarbonate in 50 ml of 50% aqueous methanol was added. A yellow precipitate started to form almost immediately. The color gradually darkened. The mixture was stirred for 20 hours at room temperature and the resultant brown solid was filtered and washed well with water and a little methanol. Air drying gave 4.60 g of the disodium salt of 2,2'-azobis(4,5-imidazolebis[carboxamidoxime]) in the form of a brown product whose ir spectrum showed no cyano group absorption but did have characteristic bands in the 3.0 μ region for —NH₂ and —OH. Vacuum drying of the product at 70° removed hydrated water and reduced the weight of product to 4.0 g, mp >310°. The material dissolved in 10% aqueous sodium hydroxide to give a deep red/maroon solution. Neutralization of this solution with hydrochloric acid gave the orange/yellow free acid form of the carboxamidoxime.

EXAMPLE 38

Charge Transfer Complex of 2,2'-Azobis(4,5-imidazoledicarbonitrile) with Tetrathiafulvalene To 0.81 g of 2,2'-azobis(4,5-imidazoledicarbonitrile) in 50 ml of acetonitrile was added slowly over 30 minutes 1.02 g of tetrathiafulvalene in 30 ml of acetonitrile. Addition caused immediate precipitation of the complex. After 30 minutes the mixture was cooled to 0° and the bronze colored plates filtered, washed with cold acetonitrile and dried. This gave 0.67 g (37%) of the charge transfer complex of 2,2'-azobis(4,5-imidazoledicarbonitrile) with tetrathiafulvalene, mp 208°–210° (dec). Evaporation of the filtrate gave another 0.9 g of crude complex. The compaction resistivity of the complex at 298° K was measured as $7 \times 10^7$ ohm -cm.

Ir(nujol): 3.18 μ (≡CH); 4.43 μ (C≡N); 7.19 μ, 7.24 μ, 8.01 μ, 12.04 μ, 13.40 μ, and 14.15 μ - remainder of spectrum is somewhat broad and diffuse.

EXAMPLE 39

2,2'-Hydrazobis(4,5-imidazoledicarbonitrile)

2.65 g of 2,2'-azobis(4,5-imidazoledicarbonitrile) was placed in a flask with 65 ml of pyridine and 25 ml of galcial acetic acid. The slurry was then purged and deoxygenated thoroughly with a stream of nitrogen. Then 3 equivalents (1.95 g) of zinc dust was added. An immediate green/black solution was formed characteristic of a radical anion species. This slowly faded to a pale green as the last of the intermediate reacted. The mixture was filtered under nitrogen to remove excess zinc salts. This gave a pale yellow solution of 2,2'-hydrazobis(4,5-imidazoledicarbonitrile). Exposure of an aliquot to the air caused immediate air oxidation back to the bright yellow azo compound which precipitated as the bis pyridinium salt.

EXAMPLES A–D

The products of this invention are colored compounds which are useful as dyes and pigments. Utility as dyes was demonstrated for several of the more soluble products by determining their effect in boiling water on selected fabrics as indicated in Table II.

Table II

| Example | Compound (Reference Example) | Effect |
|---|---|---|
| A | 2,2'-azobis(4,5-imidazoledicarbonitrile) | Dyed nylon, polyacrylonitrile, wool and silk bright yellow |
| B | 2-(4,5-dicyano-1H-imidazol-2-ylazo)-1H-imidazole-4,5-dicarboxylic acid (32) | Dyed nylon, wool and silk burnt orange |
| C | nickel complex of 2,2'-azobis-(4,5-imidazoledicarbonitrile) (17) | Dyed silk deep orange |
| D | bis(tetra-n-butylammonium) salt of 2,2'-azobis(4,5-imidazoledicarbonitrile) (12) | Dyed nylon, viscose rayon, silk and polyethylene terephthalate yellow |

EXAMPLE E 2,2'-Azobis(1-ethyl-4,5-imidazoledicarbonitrile) from Example 7 was applied as a disperse dye in ethanol and gave bright yellow colors to cellulose acetate, polyacrylonitrile, polyethylene terephthalate, nylon and silk.

I claim:

1. A compound of the formula

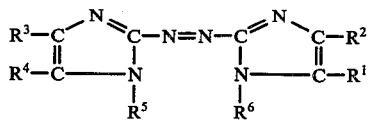

wherein $R^1$, $R^2$, $R^3$ and $R^4$ individually are H, COOH, COOR$^7$, COOM, CONH$_2$, CNOHNH$_2$, COX or CN with the proviso that up to two of $R^1$, $R^2$, $R^3$ and $R^4$ are hydrogen;

$R^5$ and $R^6$ are H, alkyl of 1–8 carbons or aralkyl in which the alkyl group has 1–8 carbons and the aryl substituent has 6–14 carbons;

$R^7$ is alkyl of 1–8 carbons;

M is one equivalent of an ammonium, a 1–8 carbon atom alkyl substituted ammonium or benzyl substituted ammonium, alkali metal or alkaline earth metal cation; and X is F, Cl, Br or I;

or a salt of said compound.

2. A compound of claim 1 where $R^5$ and $R^6$ are each alkyl.

3. A compound of claim 1 where $R^5$ and $R^6$ are each aralkyl.

4. A compound of claim 1 where $R^1$, $R^2$, $R^3$ and $R^4$ are each CN.

5. A compound of claim 1 which is (B).

6. The compound of claim 1 which is 2,2′-azobis(4,5-imidazoledicarbonitrile).

* * * * *